C. C. ALLEN.
INSTRUMENT FOR TESTING THE REFRACTION OF THE EYES.
APPLICATION FILED JAN. 23, 1914.

1,116,529.

Patented Nov. 10, 1914.
2 SHEETS—SHEET 1.

WITNESSES:
Wm. Harold Eichelman
M. A. Milord

INVENTOR:
CLIFF C. ALLEN.
BY Benj. T. Rawalt
ATTORNEY

C. C. ALLEN.
INSTRUMENT FOR TESTING THE REFRACTION OF THE EYES.
APPLICATION FILED JAN. 23, 1914.
1,116,529.
Patented Nov. 10, 1914.
2 SHEETS—SHEET 2.
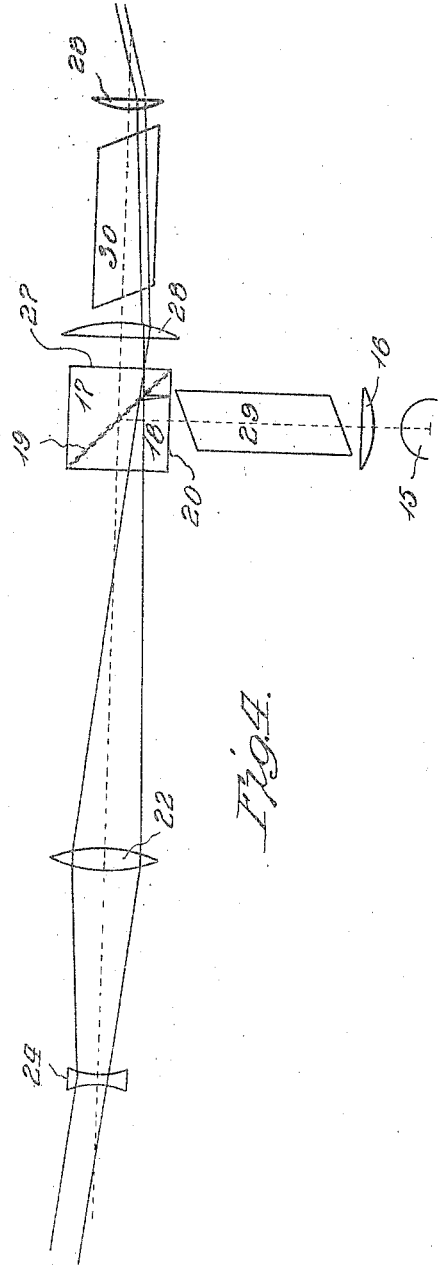
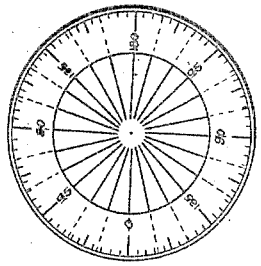
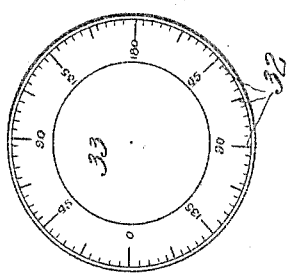
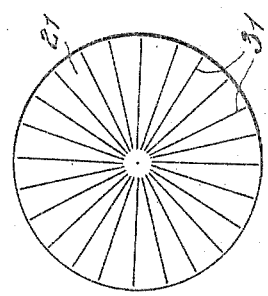

UNITED STATES PATENT OFFICE.

CLILE C. ALLEN, OF CHICAGO, ILLINOIS, ASSIGNOR TO GEO. S. JOHNSTON COMPANY, OF CHICAGO, ILLINOIS, A CORPORATION OF ILLINOIS.

INSTRUMENT FOR TESTING THE REFRACTION OF THE EYES.

1,116,529.  Specification of Letters Patent.  Patented Nov. 10, 1914.

Application filed January 23, 1914.   Serial No. 813,854.

*To all whom it may concern:*

Be it known that I, CLILE C. ALLEN, a citizen of the United States, and a resident of Chicago, county of Cook, and State of Illinois, have invented a certain new and useful Instrument for Testing the Refraction of the Eyes, of which the following is a specification.

My invention relates particularly to the provision of facilities for examining the interior of and estimating the refractive properties or capabilities of the eyes objectively as well as subjectively. That is to say, I desire to be able to ascertain the power of refraction of the eye under examination independently of what the patient or subject may report that he sees as the result of different adjustments of the instrument. The reports of the patient may and should be used as data for verifying the accuracy of the objective examination.

The particular objects of my present invention are the provision of facilities for ascertaining the refractive properties of the eye with reference to the usual standard for measuring such refraction, both generally with respect to the entire eye, and particularly with respect to particular meridians of the eye, and of viewing the fundus of the eye in an ophthalmoscopic manner.

Another and extremely important object of my present invention is to eliminate the surface reflection or flare from the cornea of the eye and the lenses employed in the instrument.

In working out my present invention I have sought an optical arrangement which would permit of the use of a scale of uniform and equal divisions.

I attain the above objects by means of the structure illustrated in the accompanying drawings, in which—

Figure 1:
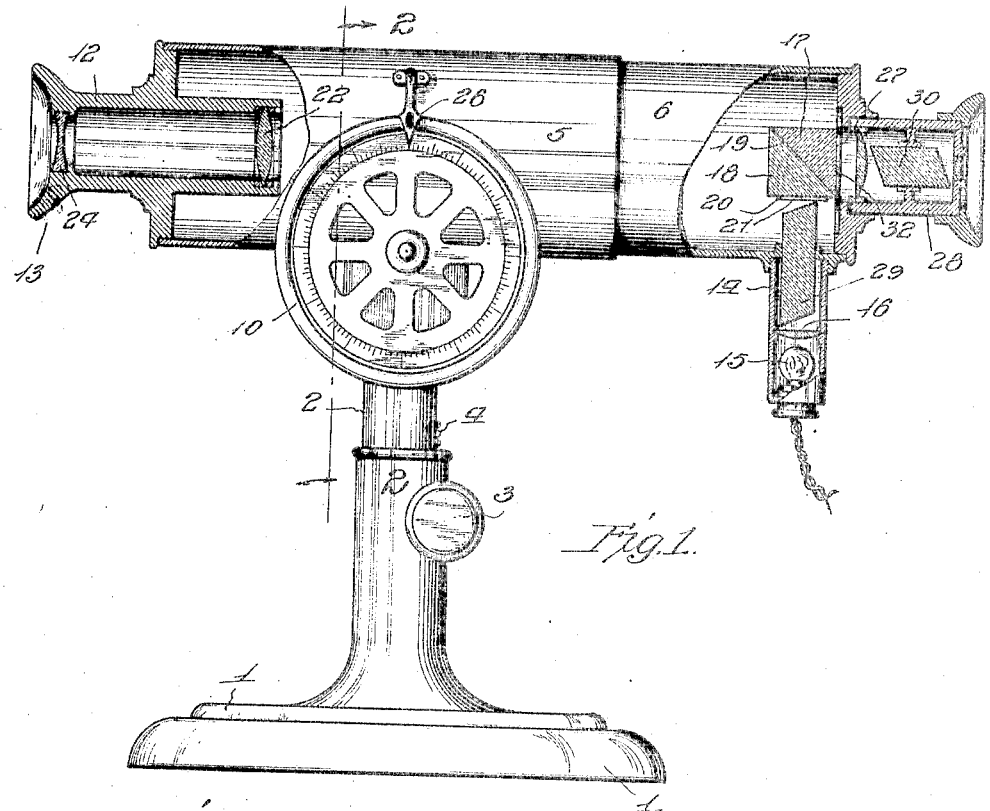
Figure 2:
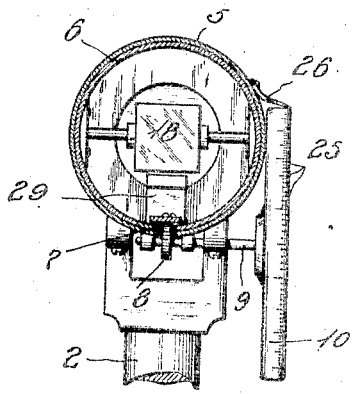
Figure 3:
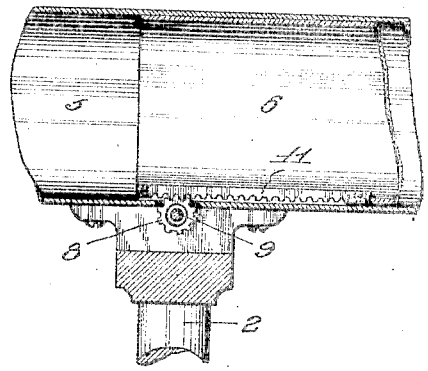

Figure 1 is a longitudinal elevation of an instrument embodying my invention, the walls of the ends whereof are partially broken away to show the arrangement of the elements of the optical system; Fig. 2 is a transverse section on line 2—2 of Fig. 1, showing the rack and pinion provided for longitudinal adjustment; Fig. 3 is a fragmental detail of the pinion and rack shown in Fig. 2; Fig. 4 is a diagrammatic or schematic view of the optical system; Fig. 5 is a view of the target; Fig. 6 is a view of the protractor for locating the meridian of the target under critical examination, and Fig. 7 is a view showing the relation of the image of the target and the protractor as seen by the observer.

Similar reference characters refer to similar parts in the several views.

The instrument may conveniently be mounted upon a stand, 1, which is provided with a vertically movable column, 2. A beaded arbor, 3, is mounted upon the stand, and upon this arbor is mounted a pinion (not shown) which coöperates with a rack, 4, upon the column to control the elevation and lowering thereof.

The instrument proper is mounted horizontally upon the top of the column, 2, and comprises an outer tube, 5, in which telescopically fits an inner tube, 6. To secure the necessary controlled movement of the tube, 6, the outer tube at 7, where it is mounted upon the column, 2, is slit, and mounted so that its teeth extend into this slit, is a gear, 8. The gear, 8, is mounted upon an arbor, 9, journaled transversely of the tubes 5 and 6 in the top of the column, 2, and upon one end of the arbor, 9, which extends to the side of the tubes, is mounted a hand wheel 10. The tube, 6, is provided with a rack, 11, which engages with the gear or pinion, 8.

Upon the outer end of and extending into the tube, 5, is provided a tube, 12, the outer end of which is formed into, or provided with, an eye cup, 13, for locating the patient's or observed eye, and mounted within the tube, 12, is the image forming portion of the lens system, to be hereinafter referred to. Entering the tube, 6, laterally near its outer end, is a tube, 14, in the outer end of which is mounted an electric light bulb, 15, and a condensing lens, 16, to render the rays of light proceeding from the bulb approximately parallel.

In the tube, 6, and in front of the tube, 14, and in the optical axis of the lens system of the instrument, are two right angled prisms, 17 and 18. The right angle prisms are arranged with their hypotenuse faces together, and the meeting surface, 19, of one of the prisms is rendered partially reflective and partially transmissive of light by partially coating it with silver or mercury or a substance suitable for that purpose. The prisms 17 and 18 are mounted so that the partially transmissive and partially reflective surface, 19, subtends the angle formed by the rays of light proceeding from the bulb, 15, and the optical axis of the lens system of the instrument, so that light coming from the bulb will be reflected by the surface, 19, along the optical axis and through the lenses mounted in the tube, 12.

Upon the surface, 20, of the prism, 18, which is adjacent the end of the tube, 14, and at right angles to and in the path of the light proceeding from the bulb, 15, is a target, 21, visible to the patient by reflection at the surface, 19, through the lens element in the tube, 12.

The surface, 19, shown as inclosed between two prisms, 17 and 18, may consist of one surface of a parallel plate, or of a prism, within the spirit of my invention. I have shown the optical system of my invention as composed of simple lenses, but any lens or lenses may be formed of more than one lens for the better correction of spherical and chromatic aberrations. The lens element mounted in the tube, 12, is composed of a positive lens, 22, and a negative lens, 24, but a single positive element or any other suitable arrangement may be employed without violating the principles of of my invention.

In order to secure equal divisions upon the scale, 25, I construct the lens system upon the following optical principles: By this arrangement a positive lens, if separated from the eye its focal length, and if the eye be emmetropic, will render distinctly visible a target placed the focal length of the lens before the lens. When, for example, the target is moved toward or away from the lens a distance of one tenth, two tenths, three tenths, or $n$ tenths of the focal length of the lens the optical effect upon the eye will be, respectively, minus or plus one tenth, two tenths, three tenths, or $n$ tenths of the dioptric power of the lens. If the lens be of ten centimeters' focus, or ten diopters, then, in the above example, each linear movement of the target of one centimeter will produce a change of power at the eye of exactly one diopter.

Such an optical arrangement as is herein described permits me to use a scale, 25, upon the periphery of the hand wheel, 10, of equal and uniform divisions, which in combination with a pointer, 26, depending from the stationary outer tube, 5, will indicate the change in refractive power in diopters and fractions thereof.

The lens elements, 22 and 24, perform the same function, optically, as the single positive lens element referred to in the above example with the advantage of securing a larger field of view within the observed eye which is of great importance when examining the eye ophthalmoscopically.

By reason of the principle of auto-collimation an image of the image of the target, 21, formed in the eye, is formed at the target, 21. The surface, 19, being partially transmissive such an image is also formed at the surface, 27, of the prism, 17, which is an equal distance from the reflecting and transmitting surface, 19, and from the retina of the eye upon which the image of the target, 21, is formed. To properly see the image formed at 27, I have provided an eye piece, 28, entering the outer end of the tube, 6.

In order to get rid of the reflection or flare from the surface of the cornea and from the optical surfaces within the instrument, which would, by reason of the glare thereof, totally obscure the relatively dim image formed at 27, I have had recourse to the following arrangement: It is known that polarized light may be reflected at an optical surface or at the cornea at angles other than polarizing angles without appreciably affecting its properties, but that if polarized light illuminates a diffusing surface, such as the retina, the properties arising from polarization are practically lost. Utilizing these facts I have interposed a polarizing medium, in this case a Nicol prism, 29, between the condensing lens, 16, and the target, 21. Such light, therefore, as is reflected from the optical surfaces within the instrument and the cornea, has the properties of polarized light, and will be extinguished by a polarizing analyzer, such as another Nicol prism, 30, conveniently located and disposed properly in the eye piece, 28, while the light illuminating the retina, having been depolarized, may be seen through the prism, 30.

In adjusting my instrument, all back reflections or flare may be extinguished by simply rotating the eye piece 28, to the proper position which is easily determined by the disappearance of the reflection or flare. While I have disclosed Nicol prisms as the polarizing agencies in the present embodiment of my invention, it is manifest that any polarizing agencies may be employed without departing from the spirit of my invention.

With astigmatic eyes, owing to the fact that the refractive portions of the eye are unequal in different meridians instead of spherical, it is not possible to focus an image with critical definition upon all meridians at the same time. For the purpose of facilitating the testing of astigmatic eyes and locating the meridians of greatest and least refraction I have provided the target, 21, of the design shown in Fig. 5, comprising the simple radiating lines, 31, in combination with the protractor dial, 32, shown in Fig. 6, the central portion, 33, of which is clear. The protractor dial, 32, is disposed upon the surface, 27, of the prism, 17, so that the collimated image of the target, 21, will appear in the center, 33, of, and superimposed upon, the plane of the protractor, 32, and be seen contemporaneously therewith, as shown in Fig. 7, through the eye piece 28. With such an arrangement either the strongest or weakest meridian of refraction is brought into critical focus. Its refractive power is noted and also its location upon the protractor, 32. The meridian having the greatest refractive difference from the first examined is then brought into critical focus, and its power and location noted. In regularly astigmatic eyes the meridians of greatest and least refraction are ninety degrees apart. The amount of astigmatism present will be indicated by the difference between the readings on the scale, 25, for these two meridians.

My invention may be used for examining the eyes in different ways. As an ophthalmoscope, for examination of the fundus, by disregarding the image of the target, 21, and the protractor, 27. As an ophthalmoscope for estimating errors of refraction, by disregarding the image of the target, 21, and adjusting the instrument for viewing different meridians of the fundus. As a combined objective and subjective test in the manner already described. As a combined ophthalmoscope and optometer in which the results obtained by the ophthalmoscopic method may be directly compared with the results obtained by the instrument as an optometer.

Having described my invention, what I claim as new and desire to secure by Letters Patent, is:—

1. In an instrument for examining the eye, a centered lens system for projecting an image upon the retina of the eye, and means for viewing said image through said lens system.

2. In an instrument of the class described, a centered lens system for projecting an image upon the retina of the eye, and means for viewing said image through said lens system simultaneously with a fixed scale for comparison.

3. In an instrument of the class described, means for projecting an image upon the retina, means for viewing said image, a polarizing device and an analyzing device for extinguishing all light except that proceeding from the retina.

4. In an instrument of the class described, means for illuminating the interior of the eye, means for viewing the fundus, a polarizing device and an analyzing device for extinguishing light reflected at surfaces intervening between the retina and the projected image of the fundus.

5. In an optical instrument, an image forming lens system, a polarizing device for illuminating the object to be viewed with polarized light and a polarizing analyzing device for extinguishing polarized light reflected from surfaces intervening between an object and its image.

6. An instrument for testing the refractive power of the eye comprising a relatively fixed tube, an eye locating cup mounted in one end of said tube, a lens element mounted in said tube its equivalent focal length from said eye location, a second tube telescoping within said first tube, an arbor and means connected therewith for moving said second tube longitudinally with respect to said first tube, a wheel mounted upon said arbor, a scale upon said wheel for showing the refractive condition obtained by different adjustments, an eye piece mounted in the outer end of said second tube, two right angled prisms with their hypotenuse faces together mounted in front of said eye piece, the hypotenuse of one of said prisms being rendered partially reflective and partially transmissive, an illuminating tube entering said second tube laterally opposite said prisms and at a reflecting angle with said partially reflecting and partially transmitting surface, a target mounted upon the face of said prism adjacent the opening of said illuminating tube, a protractor scale upon the face of the prism adjacent said eye piece, a polarizing element mounted in said illuminating tube, and a polarizing analyzer mounted in said eye piece.

7. An instrument for testing the refractive power of the eye comprising a relatively fixed tube, an eye locating cup mounted in one end of said tube, focalizing means mounted in said tube its equivalent focal length from said eye location, a second tube telescoping within said first tube, an arbor and means connected therewith for moving said second tube longitudinally with respect to said first tube, a wheel mounted upon said arbor, a scale upon said wheel for showing the refractive condition obtained by different adjustments, an eye piece mounted in the outer end of said second tube, two right angled prisms with their hypotenuse faces together mounted in front of said eye piece, the hypotenuse of one of said prisms being rendered partially reflective and partially transmissive, an illuminating tube entering said second tube laterally opposite said prisms and at a reflecting angle with said partially reflecting and partially transmitting surface, a target mounted upon the face of said prism adjacent the opening of said illuminating tube, a protractor scale upon the face of the prism adjacent said eye piece.

8. In an instrument for testing the refractive properties of the eye, a lens system, a target, a reflector for reflecting light from the target through the lens system, means for viewing the image of the projected target, and polarizing elements interposed before the reflector and before the viewing means.

9. In an instrument of the class described having illuminating means, a lens, means for directing the illumination through said lens, means for viewing through said lens the area illuminated as aforesaid, and means for eliminating reflection from the lens and the area under examination comprising a polarizing element located adjacent said illuminating means, and a polarizing analyzing element located anterior to said viewing means.

10. In an instrument for testing the refractive properties of the eye, a lens system, a target, a reflector for reflecting light from the target through the lens system, a protractor scale located at the point where the image of the image is formed, and means for viewing the image of the image of the target and the protractor scale simultaneously.

In testimony whereof I affix my signature in the presence of two witnesses.

CLILE C. ALLEN.

Witnesses:
M. A. MILARD,
BENJ. T. ROODHOUSE.